United States Patent
Elsmark

(10) Patent No.: US 10,639,770 B2
(45) Date of Patent: May 5, 2020

(54) METHOD FOR DETERMINING THE MAGNITUDE OF THE OUTPUT TORQUE AND A POWER WRENCH

(71) Applicant: ATLAS COPCO INDUSTRIAL TECHNIQUE AB, Stockholm (SE)

(72) Inventor: Karl Johan Lars Elsmark, Saltsjö-Boo (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 239 days.

(21) Appl. No.: 15/543,022

(22) PCT Filed: Jan. 19, 2016

(86) PCT No.: PCT/EP2016/050992
§ 371 (c)(1),
(2) Date: Jul. 12, 2017

(87) PCT Pub. No.: WO2016/116433
PCT Pub. Date: Jul. 28, 2016

(65) Prior Publication Data
US 2018/0001446 A1  Jan. 4, 2018

(30) Foreign Application Priority Data
Jan. 21, 2015  (SE) ...................... 1550047

(51) Int. Cl.
*B25B 23/147* (2006.01)
*B25B 23/142* (2006.01)
(Continued)

(52) U.S. Cl.
CPC ........ *B25B 23/147* (2013.01); *B25B 23/1422* (2013.01); *B25B 23/1456* (2013.01); *G01L 5/24* (2013.01); *B25B 23/141* (2013.01)

(58) Field of Classification Search
CPC ..... B25B 21/00; B25B 23/14; B25B 23/1422; B25B 23/1453; B25B 23/1456; B25B 23/147; G01L 5/24
(Continued)

(56) References Cited

U.S. PATENT DOCUMENTS

2008/0271580 A1* 11/2008 Marie ...................... B23P 19/06
81/467
2010/0206141 A1* 8/2010 Nakata ................ B25B 23/1425
81/479
(Continued)

FOREIGN PATENT DOCUMENTS

WO        2012150303 A1    11/2012

OTHER PUBLICATIONS

International Search Report (ISR) and Written Opinion dated Apr. 26, 2016 issued in International Application No. PCT/EP2016/050992.

*Primary Examiner* — Hemant Desai
*Assistant Examiner* — Jacob A Smith
(74) *Attorney, Agent, or Firm* — Holtz, Holtz & Volek PC

(57) ABSTRACT

A method of verifying a magnitude of a delivered output torque during a tightening operation of a threaded joint performed by a hand held power wrench including a housing, a motor, an output shaft, and a power transmission connecting the motor to the output shaft. The method includes: tightening the threaded joint; monitoring a magnitude of a direct torque acting along the power transmission during the tightening by at least one direct torque indicating sensor; monitoring a magnitude of a reaction torque transferred via the housing during the tightening by at least one reaction torque sensor; comparing the monitored magnitude of the direct torque with the monitored magnitude of the reaction torque; and determining, based on the comparison,
(Continued)

whether the accuracy of the delivered output torque is acceptable.

12 Claims, 1 Drawing Sheet

(51) Int. Cl.
    *B25B 23/145*     (2006.01)
    *G01L 5/24*     (2006.01)
    *B25B 23/14*     (2006.01)

(58) Field of Classification Search
    USPC ........................................................ 173/100
    See application file for complete search history.

(56) References Cited

U.S. PATENT DOCUMENTS

| | | | | |
|---|---|---|---|---|
| 2010/0269646 A1* | 10/2010 | Le Du | ................... | B25B 13/481 81/478 |
| 2011/0000688 A1* | 1/2011 | Iwata | ................... | B25B 21/00 173/1 |
| 2011/0079406 A1* | 4/2011 | Elsmark | ................... | B25B 21/00 173/1 |
| 2011/0100170 A1* | 5/2011 | Chiapuzzi | ........... | B25B 23/1425 81/479 |
| 2011/0132157 A1* | 6/2011 | Duvan | ................... | B25B 13/462 81/479 |
| 2011/0162493 A1* | 7/2011 | Anjanappa | .......... | B25B 23/1425 81/479 |
| 2011/0185863 A1* | 8/2011 | Hsieh | ................... | B25B 23/142 81/479 |
| 2011/0247434 A1* | 10/2011 | Carlin | ................... | G01L 25/003 73/862.21 |
| 2012/0006161 A1* | 1/2012 | Chen | ................... | B25B 23/1425 81/479 |
| 2012/0325507 A1* | 12/2012 | Fluhrer | ..................... | G01L 5/24 173/20 |
| 2013/0105189 A1* | 5/2013 | Murthy | ................... | B25B 21/00 173/178 |
| 2013/0199344 A1* | 8/2013 | Lee | ..................... | B25B 23/1425 81/467 |
| 2013/0249700 A1* | 9/2013 | Hsieh | .................. | B25B 23/1425 340/665 |
| 2014/0009305 A1* | 1/2014 | Schultz | ................... | B25B 23/14 340/870.01 |
| 2014/0011621 A1* | 1/2014 | Steckel | ................... | B25B 21/00 475/149 |
| 2014/0026723 A1* | 1/2014 | Persson | ................... | B25B 21/00 81/479 |
| 2014/0096985 A1* | 4/2014 | Chu | ....................... | B25B 21/02 173/1 |
| 2014/0096989 A1* | 4/2014 | Le Du | ..................... | B25B 21/00 173/216 |
| 2014/0102741 A1* | 4/2014 | Sekino | .................... | B25B 21/02 173/181 |
| 2014/0165796 A1* | 6/2014 | Gauthier | ............ | A61B 17/8875 81/479 |
| 2014/0262404 A1* | 9/2014 | Sawano | ................... | B25B 21/00 173/178 |
| 2014/0338419 A1* | 11/2014 | Hsieh | ................... | B25B 23/1422 73/1.12 |
| 2014/0367134 A1* | 12/2014 | Phillips | ..................... | B25F 5/00 173/176 |

\* cited by examiner

METHOD FOR DETERMINING THE MAGNITUDE OF THE OUTPUT TORQUE AND A POWER WRENCH

TECHNICAL FIELD

The invention relates to a method for obtaining an improved accuracy in determining the magnitude of the output torque delivered by a power wrench and a power wrench for performing the method.

BACKGROUND

In a common and well known prior art type of power wrenches the output torque is measured and determined via signals from a load indicator provided in the power transmission between the motor and the output shaft. This load indication is accomplished by a sensor provided between the stationary ring gear of a planetary reduction gearing and the power wrench housing and is in fact an indication of the reaction torque transferred via the ring gear to the housing. The torque delivered via the output shaft is then calculated from that measured reaction torque load on the ring gear. This gives in fact only an indirect value of the torque magnitude delivered via the output shaft, and since there inevitably are varying frictional conditions and tolerances of the components of the mechanical power transmission there will always be some deviations of the calculated output torque value from the delivered torque magnitude. Not least the mechanical wear of the angle drive in angle type power wrenches is a common source of error when determining the delivered output torque magnitude.

Another prior art method for determining the delivered torque of a power wrench comprises measurement of the torsional deflection of an inline torque transferring component of the power transmission during load application on the output shaft. This is a direct measurement of the transferred torque, but there are uncertainties depending on manufacturing tolerances, friction conditions, mechanical wear etc. which contribute to cause deviations and scattering of the determined torque magnitude delivered via the output shaft in comparison with the measured torque level. A problem is that there is no way to know whether a deviation is acceptable or not. This may lead to that an individual tightening operation may appear to be acceptable, where in fact the delivered target torque is far from the desired target torque due to an abnormal deviation.

To be able to get a reliable information of the delivered torque magnitude and, hence a high and approved quality of a tightening process via any of the above described prior art torque measuring methods there have been required repeated and costly individual power wrench calibration operations.

SHORT DESCRIPTION OF THE INVENTION

It is an object of the invention to provide a method and a power wrench for obtaining an improved accuracy and reliability of the measured and determined magnitude of the output torque delivered by a power wrench, thereby ensuring a high tightening process quality without requiring any undesirable calibration operations.

The above object of the invention is achieved by the invention according to a first and a second aspect.

According to a first aspect the invention relates to a method of verifying the magnitude of a delivered output torque during a tightening operation of a threaded joint performed by a hand held power wrench including a housing, a motor, an output shaft, and a power transmission connecting the motor to the output shaft. The method involves the following steps:

tightening a threaded joint, monitoring a magnitude of a direct torque acting along the power transmission during said tightening by means of one or more direct torque indicating sensors (25,26), monitoring a magnitude of a reaction torque transferred via the housing during said tightening by means of one or more reaction torque sensors (34,35;38,39), comparing the monitored magnitude of the direct torque with the monitored magnitude of the reaction torque, and based on said comparison, determine whether the accuracy of the delivered output torque is acceptable.

Throughout this description a direct torque is used to denote the torque delivered by the motor to the output shaft and which is monitored somewhere along the power transmission, regardless of how the torque is measured, wherein the term reaction torque is used to denote the torque created as a reaction of the applied torque, typically experienced in the housing of the power wrench.

In a specific embodiment of the inventive method the magnitude of the monitored direct torque along the power transmission is monitored by sensing a torque transferred from the power transmission to the housing of the power wrench.

In another specific embodiment of the inventive method the magnitude of the reaction torque transferred via the housing is monitored by a measurement of the strain on the housing of the power wrench.

In yet another specific embodiment of the inventive method the magnitude of the reaction torque transferred via the housing is monitored by measurement of the strain on a reaction bar connected to the housing.

According to a second aspect the invention relates to a power wrench comprising a housing, a motor, an output shaft, a power transmission connecting the motor to the output shaft, and one or more direct torque indicating sensors provided in the power transmission to monitor a magnitude of a direct torque delivered by the power wrench during a tightening operation. The power wrench further comprises one or more reaction torque sensors arranged to monitor the magnitude of a reaction torque during the tightening operation, wherein a control unit is arranged to compare the monitored direct torque with the monitored reaction torque and, based on said comparison, to determine whether an accuracy of the tightening operation is acceptable.

In a specific embodiment of the inventive power wrench said one or more reaction torque sensors are arranged on the housing and configured to monitor the magnitude of the reaction torque transferred via the housing.

In another specific embodiment of the inventive power wrench it comprises a reaction bar, wherein one or more reaction torque sensors are arranged on said reaction bar and configured to monitor the magnitude of the reaction torque acting in the bar.

In yet another specific embodiment of the inventive power wrench the one or more direct torque indicating sensors are provided between a part of the transmission and the housing and are configured to monitor the torque transferred from the power transmission to the housing.

With the invention according to the first and second aspect the reliability of the magnitude of the torque delivered by a power wrench is improved by the fact that it may be instantly compared to a sensed reaction torque. Hence, the invention gives the possibility to roughly and rapidly approve a tightening operation without the use of external sensing apparatuses.

Further characteristic features and advantages of the invention will appear from the following specification and claims.

SHORT DESCRIPTION OF THE DRAWINGS

A specific embodiment of the invention is described below with reference to the accompanying drawing, of which:

DETAILED DESCRIPTION OF THE INVENTION

Figure 1:
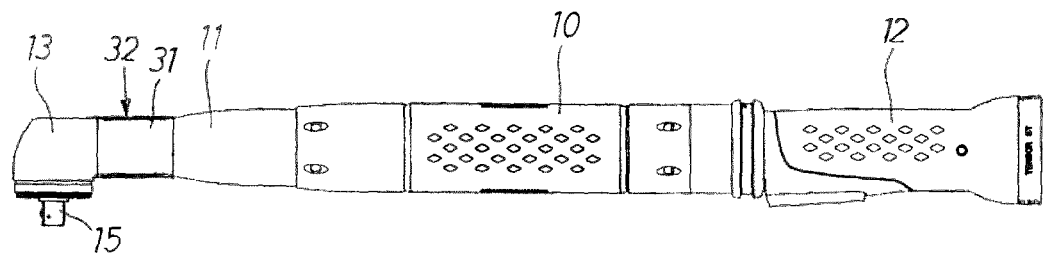
FIG. 1 is a side view of an angle type power wrench according to the invention.
Figure 2:
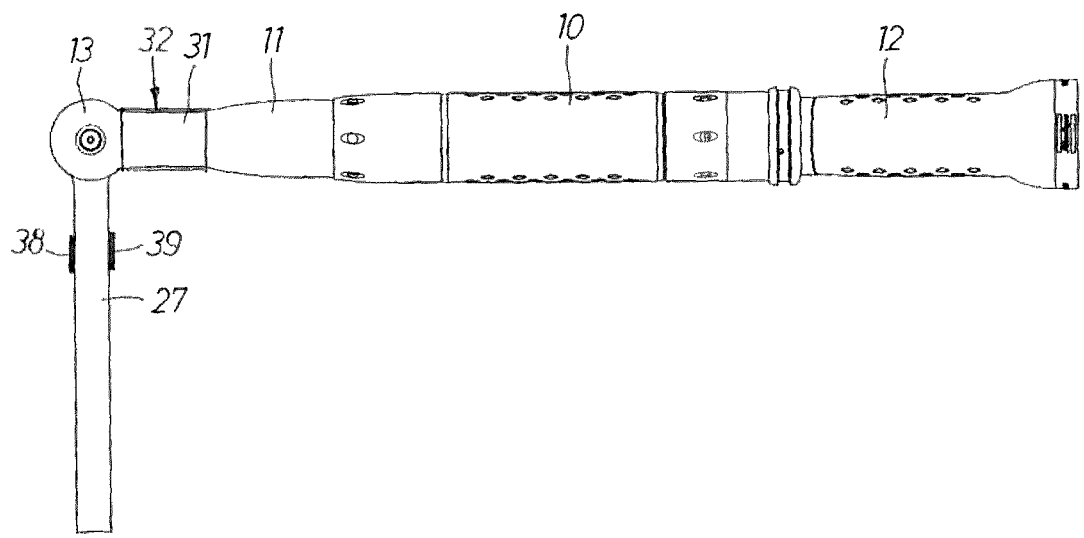
FIG. 2 is a top view of the power wrench in FIG. 1 illustrating an alternative embodiment of the invention including a torque reaction bar attached to the wrench housing.

The power wrench illustrated in the drawing figures is a hand held electrically powered angle nut runner which comprises an elongate housing 10 with a front section 11, a rear handle 12 and a forward angle head 13 including an angle gear 14 with an output shaft 15. In the housing 10 there is supported a non-illustrated electric motor and a power transmission 16 connecting the motor to the output shaft 15 via inter alia the angle gear 14.

The power transmission 16 comprises a two-stage planetary type reduction gearing having a common ring gear 18. In the shown embodiment the latter is arranged to transfer a torque to the housing 10 via a torque sensing unit consisting of a sleeve shaped element 23 which at its forward end is connected to the ring gear 18 and at its rear end to the housing 10. The sleeve 23 has a thin-walled middle section 24 which is relatively weak and arranged to yield elastically to the torsional load caused by the transferred torque. Torque indicating sensors 25,26 in the form of strain sensors are attached to the weak middle section 24 and arranged to generate signals in response to the transferred torque. These sensors 25,26 are in throughout this description referred to as direct torque sensors to demonstrate they correspond to the active torque transferred from the motor to the output shaft 15 via the power transmission 16. The output torque delivered by the output shaft 15 could be calculated from the signals generated by the sensors 25,26 with certain design related factors taken into account. This calculation is obtained by a non-illustrated control unit to which the sensors 25,26 are connected. The control unit is preferably located inside the wrench housing 10.

This is one of a number of well-known techniques for determining the output torque of a power wrench. However, due to irregularities and mechanical wear of gearing components, not least varying torque losses in the angle drive 13, there are errors involved in an output torque determined in this manner. Accordingly, the output torque determined indirectly via calculation is uncertain and could differ from the torque magnitude delivered to the joint. This results in an undesirable uncertainty regarding the quality of the tightening operations performed by the power wrench. The tendency is that the output torque determined this way is too high in comparison with the delivered torque magnitude, which means that tightening operations may be interrupted prematurely and result in unacceptably low screw joint clamping forces with a risk for costly damages or even collapse of an assembled structure.

It is an object of the invention to provide a method and a power wrench by which the accuracy and quality of performed tightening operations are substantially improved. This is obtained in that a difference between two independently indicated torque measurements is checked against each other and predetermined acceptance limits. Accordingly, the method according to the invention comprises a combination of the prior art method of determining the output torque via the direct torque measured along the power transmission 16 and an reaction torque measurement, namely a measurement of the reaction torque transferred by the power wrench housing 10.

Figure 3:
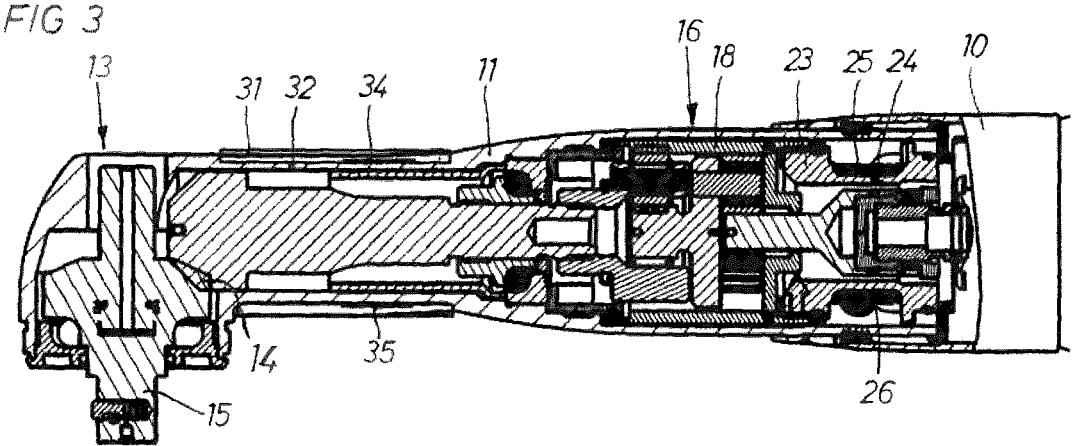
FIG. 3 shows, on a larger scale, a longitudinal section through the front part of the power wrench in FIG. 1.

As illustrated in FIG. 3, the front section 11 of the housing 10 has a reduced diameter part 32 which is relatively weak and will yield elastically to the reaction torque that is transferred via the housing to the operator. Therefore, this weak part 32 is provided with sensors 34,35 in the form of strain sensors which are protected by a surrounding tubular shield 31. These sensors 34,35 are referred to as reaction torque sensors since they are arranged to monitor torque created as a reaction to the delivered torque. The reaction torque sensors 34,35 in the shown embodiment are arranged to generate signals in response to the diminutive elastic deformations of the front section part 32, which signals correspond to the reaction torque transferred via the housing 10 and which are counteracted by the operator via the handle 12.

In FIG. 3 the reaction torque sensors 34,35 are illustrated as being mounted on the top and bottom surfaces of the front section 11, but could as well be located in different locations on the weak front section part 32. The entire reduced diameter part 32 constitutes an area that is suitable for indicating reaction torque strain on the housing.

The reaction torque sensors 34,35 are connected to the same control unit as the direct torque sensors 25,26 on the element 23 in the power transmission 16, wherein the signals received from the reaction torque sensors 34,35 are compared with the signals received from the direct torque sensors 25,26, and the difference between the signals from the two sets of sensor is calculated. This difference is then compared with predetermined limit values by which the process control unit is programmed. If this difference is within the predetermined limit values the indicated output torque is approved as an acceptable torque measurement. Normally, the monitored direct torque should be greater than the monitored reaction torque. A too big difference indicates a deteriorated function of the power transmission with an abnormal torque loss between the motor and the output shaft 15. The reason could be insufficient lubrication and/or an extensive wear or damage of transmission parts. The power wrench should be then taken to service or repair.

In the alternative embodiment of the invention reaction torque sensors 38,39 are mounted on the torque reaction bar 27 so as to generate signals in response to the reaction torque transferred to the housing 10. The reaction bar 27 is mounted at the angle head 13 and is intended to be applied against an immobile structure adjacent a screw joint being tightened. Since the reaction torque is transferred from the housing 10 at its foremost part there is no strain to be indicated in the front section 11 of housing 10, as in the above described example. Similarly to the above described embodiment, however, the signals received from the reaction torque sensors 38,39 are compared to the signals received from the direct torque sensors 25,26 on the reaction torque transferring sleeve element 23 of the power transmission 16, and a difference between the signals is calculated. If this difference is too big, i.e. the span between the signals from the two sets of sensors extends beyond the programmed limit values programmed in the control unit the indicated output torque is not approved as an acceptable torque measurement.

It is to be understood that the embodiments of the invention are not limited to the above described example but may be freely varied within the scope of the claims. For instance, the torque indicating sensors provided in the power transmission may be of different types. Instead of indicating a torque transferred between a reduction gearing part and the housing, an in-line torque sensing device associated with a drive spindle may be used, for example a drive spindle of a magnetostrictive material combined with inductive sensors.

The invention claimed is:

1. A method of verifying a magnitude of a delivered output torque during a tightening operation of a threaded joint performed by a hand held power wrench comprising a housing, a motor, an output shaft, and a power transmission connecting the motor to the output shaft, wherein the method comprises:
   tightening the threaded joint;
   monitoring a magnitude of a direct torque acting along the power transmission during said tightening by at least one direct torque indicating sensor;
   monitoring a magnitude of a reaction torque transferred via the housing during said tightening by at least one reaction torque sensor;
   comparing the monitored magnitude of the direct torque with the monitored magnitude of the reaction torque; and
   determining, based on said comparison, whether a difference between the monitored magnitude of the direct torque and the monitored magnitude of the reaction torque is within predetermined limit values.

2. The method according to claim 1, wherein the magnitude of the monitored direct torque along the power transmission is monitored by sensing a torque transferred from the power transmission to the housing.

3. The method according to claim 1, wherein the magnitude of the reaction torque transferred via the housing is monitored by a measurement of a strain on the housing of the power wrench.

4. The method according to claim 2, wherein the magnitude of the reaction torque transferred via the housing is monitored by a measurement of a strain on the housing of the power wrench.

5. The method according to claim 1, wherein the magnitude of the reaction torque transferred via the housing is monitored by measurement of a strain on a reaction bar connected to the housing of the power wrench.

6. The method according to claim 2, wherein the magnitude of the reaction torque transferred via the housing is monitored by measurement of a strain on a reaction bar connected to the housing of the power wrench.

7. A power wrench comprising:
   a housing;
   a motor;
   an output shaft;
   a power transmission connecting the motor to the output shaft; and
   at least one direct torque indicating sensor provided in the power transmission to monitor a magnitude of a direct torque delivered by the power wrench during a tightening operation,
   wherein:
      at least one reaction torque sensor is arranged to monitor a magnitude of a reaction torque during the tightening operation, and
      a control unit is arranged to compare the monitored direct torque with the monitored reaction torque, and based on said comparison, to determine whether a difference between the monitored magnitude of the direct torque and the monitored magnitude of the reaction torque is within predetermined limits.

8. The power wrench according to claim 7, wherein the at least one reaction torque sensor is arranged on the housing and configured to monitor the magnitude of the reaction torque transferred via the housing.

9. The power wrench according to claim 7, further comprising a reaction bar, wherein the at least one reaction torque sensor is arranged on the reaction bar and configured to monitor the magnitude of a reaction torque acting in the bar.

10. The power wrench according to claim 7, wherein the at least one direct torque indicating sensor is provided between a part of the transmission and the housing and is configured to monitor a torque transferred from the power transmission to the housing.

11. The power wrench according to claim 8, wherein the at least one direct torque indicating sensor is provided between a part of the transmission and the housing and is configured to monitor a torque transferred from the power transmission to the housing.

12. The power wrench according to claim 9, wherein the at least one direct torque indicating sensor is provided between a part of the transmission and the housing and is configured to monitor a torque transferred from the power transmission to the housing.

* * * * *